United States Patent [19]

Lundberg

[11] 4,118,361

[45] * Oct. 3, 1978

[54] METHOD FOR CONTROLLING VISCOSITY OF ORGANIC LIQUIDS

[75] Inventor: Robert D. Lundberg, Somerville, N.J.

[73] Assignee: Exxon Research & Engineering Co., Linden, N.J.

[ * ] Notice: The portion of the term of this patent subsequent to Jan. 6, 1993, has been disclaimed.

[21] Appl. No.: 632,454

[22] Filed: Nov. 17, 1975

Related U.S. Application Data

[63] Continuation-in-part of Ser. No. 470,806, May 17, 1974, Pat. No. 3,931,021.

[51] Int. Cl.$^2$ ............... C08K 5/04; C08K 5/16; F17D 1/16; F17D 1/17
[52] U.S. Cl. ................... 260/31.8 G; 137/13; 260/30.2; 260/30.4 A; 260/30.4 R; 260/30.6 R; 260/30.8 R; 260/31.8 Z; 260/32.4; 260/32.6 R; 260/32.6 A; 260/32.6 PQ; 260/33.6 UA; 260/33.8 UA; 260/32.8 UA; 260/33.2 R; 260/33.4 R; 260/33.4 PQ
[58] Field of Search ............ 260/33.6 UA, 30.4 R, 260/30.4 A, 33.8 UA, 32.6 R, 32.6 A, 32.6 PQ, 33.4 R, 33.4 PQ, 31.8 G, 31.8 Z, 30.2; 137/13

[56] References Cited

U.S. PATENT DOCUMENTS

| | | | |
|---|---|---|---|
| 2,454,824 | 11/1948 | Moscowitz | 252/33 |
| 2,638,445 | 5/1953 | Young et al. | 252/33 |
| 3,396,136 | 8/1968 | Dickerson | 260/30.6 |
| 3,642,728 | 2/1972 | Canter | 260/79.3 |
| 3,679,382 | 7/1972 | Cohrs et al. | 44/7 D |
| 3,925,280 | 12/1975 | Lundberg et al. | 260/34.2 |
| 3,931,021 | 1/1976 | Lundberg | 252/32.5 |

*Primary Examiner*—Allan Lieberman
*Attorney, Agent, or Firm*—R. J. Baran; R. E. Nanfeldt

[57] ABSTRACT

The instant invention relates to a process for controlling the viscosity of organic liquids by incorporating in said liquid a minor amount of an ionic polymer, and a cosolvent for the ionic groups of said polymer. The ionic polymer comprises a backbone which is substantially soluble in said organic liquid, and pendant ionic groups which are substantially insoluble in said organic liquid. A cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated polymer containing from 0.2 up to 10.0 mole % ionic groups which has been neutralized by a basic material selected from Groups IA and IIA, IB and IIB of the Periodic Table of the Elements (and also lead, tin and antimony) and a nonvolatile alcohol or amine cosolvent.

15 Claims, No Drawings

METHOD FOR CONTROLLING VISCOSITY OF ORGANIC LIQUIDS

CROSS REFERENCE TO RELATED CASES

This application is a continuation-in-part of U.S. Ser. No. 470,806, (now U.S. Pat. No. 3,931,021) filed May 17, 1974 in the name of Robert D. Lundberg.

FIELD OF THE INVENTION

The instant invention relates to a process for controlling the viscosity of organic liquids by incorporating in said liquid a minor amount of an ionic polymer, and a cosolvent for the ionic groups of said polymer. The ionic polymer comprises a backbone which is substantially soluble in said organic liquid, and pendant ionic groups which are substantially insoluble in said organic liquid. A cosolvent is selected which will solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated polymer containing from 0.2 up to 10.0 mole % ionic groups which has been neutralized by a basic material selected from Groups IA and IIA, IB and IIB and also lead, tin and antimony of the Periodic Table of the Elements and a nonvolatile alcohol or amine as the cosolvent.

BACKGROUND OF THE PRIOR ART

The rapid decrease in viscosity of liquids with increasing temperature is well known. Ideally, for many applications (automobile lubricants, etc.) it would be desirable to solve this problem so that liquid viscosity would be insensitive to temperature. Alternatively it might be desirable to provide liquid systems whose viscosities actually increase with temperature. To the best of our knowledge, neither of these goals have been accomplished in a reversible manner prior to this invention. It is true that with selected polymeric additives, it has been possible to reduce substantially the viscosity change with temperature which does occur with most oils and similar systems. These polymer additives, known as viscosity index improvers (or V.I. Improvers) are generally high molecular weight polymers.

The way in which these additives function can be summarized very briefly. In effect they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however at elevated temperatures the polymer is more highly solvated such that the polymer expands and is a relatively more effective thickener.

While these V.I. Improvers have proven successful commercially, it is important to note that their effect at reducing viscosity changes with temperatures is rather mild. For a typical base oil containing a suitable V.I. Improver the kinematic viscosity will still decrease by a factor of from 5 to 10 as the temperature increases from 30° to 100° C. Obviously, if it is desired to hold the viscosity roughly constant with such temperature changes, current technology has not offered an appropriate additive system.

U.S. Pat. No. 3,396,136 describes how copolymers of alkenyl aromatic sulfonic acids, when properly neutralized, can be employed as thickeners for non-polar solvents. Those metal sulfonate systems have been shown to be very effective; however, when employed as 2 component systems (i.e., ionic polymer plus non-polar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which under some conditions can result in the availability of a small amount of polar co-solvent—i.e., a solvent for the sulfonate groups about equal in amount to the amount of sulfonate groups which are present. This amount of polar cosolvent is not within the critical limits of the instant invention, which require amounts of the third component (which interacts with the ionomeric groups of the ionomer copolymer) at levels which range from 10 to 600 times the molar equivalent of ionic groups. This level of cosolvent is about one to two orders of magnitude or more higher than employed in the cited art. This amount of such cosolvent is required to obtain the unusual and unexpected viscosity-temperature behavior which is observed. In addition, the cited patent is restricted to aromatic sulfonate polymers. The instant invention describes other polymers such as sulfonated ethylene propylene terpolymers, sulfonated butyl, etc.

U.S. Pat. No. 3,666,430 teaches the gelling of organic liquids by the interaction of polar "associative bonds" which includes hydrogen bonding and "ionic crosslinking." Again this patent specifies that 2 components are necessary—the associating polymer (or polymers in some cases) and the non-polar organic liquid. There is no mention of a third polar cosolvent except to point out that such polar liquids should not be present. Specifically this patent states (Column 2, line 7) that the hydrocarbon liquids to which this invention is to be applied should not contain a substantial portion of a miscible protolytic liquid such as methanol. It is clear that the language of this patent limits this invention to gels and further that any amount of polar liquids which are present to an extent where they disrupt those gels are undesirable. The instant invention is distinct from that cited in that amounts of such polar compounds as will break up gel at ambient conditions are required, and in fact the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (Column 3, line 72) that it is critical that in the preparation of such polymers no surface active agent, catalyst or other additive be employed which introduces a metallic ion into the system. Therefore it is preferred to employ ammonium or amine salts. It is clear that this invention (U.S. Pat. No. 3,679,382) specifically precludes the use of metallic counterions—and is directed towards amine or ammonium derivatives. Only metallic counterions are effective in the instant invention—and that, in fact, attempts to employ amine derivatives have not resulted in the results which are the objectives of this invention. Finally this cited patent does describe (Column 7, lines 13-19) that the addition of alcohols will reduce the viscosity of the thickened hydrocarbon and alter flow characteristics thereof.

SUMMARY OF THE INSTANT INVENTION

It is now unexpectedly discovered that the viscosity of organic liquids may be conveniently controlled by incorporating in said organic liquid a minor amount of the ionomeric polymer and a polar cosolvent. The ionomeric polymer is characterized as having a backbone which is substantially soluble in said organic liquid, and pendant ionic groups which are substantially insoluble in said organic liquid.

The number of ionic groups contained in the ionic polymer is a critical parameter affecting this invention. The number of ionic groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation the polymer can be considered to be prepared from a hypothetical monomer having an average molecular weight, which is the average of the two monomer components. Similarly for terpolymers the same averaging concepts apply, however three components are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milli-equivalents of sulfonic acid groups per 100 gms of polymer. This latter procedure provides a rapid and independent measure of sulfonic acid content in a polymer through simple titration. This value is obtained from the above by simply stating the moles or equivalents of acid per 100 gms: $100/38.9 \times 0.01 = 0.0257$ or $1000 \times 0.0257 = 25.7$ milli-equivalents acid/100 gms of polymer.

Both mole percent sulfonate and milli-equivalent of sulfonate will be employed to describe the ionic polymers employed in this invention.

In general, the ionomeric polymer will comprise from 0.1 to 25 mole % pendant ionomeric groups, more preferably from 0.2 to 10 mole % pendant ionomeric groups. The ionic groups may be conveniently selected from the group consisting of carboxylate, phosphonate, and sulfonate, preferably sulfonate groups. The ionomers utilized in the instant invention are neutralized with the basic materials selected from Groups IA, IIA, IB, and IIB of the Periodic Table of the Elements (lead, tin, and antimony). Ionic polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers.

Neutralization of the cited polymers with appropriate metal hydroxides, metal acetates, metal oxides, etc. can be conducted by means well known in the art. For example, the sulfonation process as with butyl rubber containing a small 0.3 to 1.0 mole % unsaturation can be conducted in a suitable solvent such as toluene with acetyl sulfate as the sulfonating agent. The resulting sulfonic acid derivative can then be neutralized with a number of different neutralization agents such as sodium acetate, sodium ethoxide, sodium hydroxide, sodium phenolate and similar metal salts. The amounts of such neutralization agents employed will normally be equal stoichiometrically to the amount of free acid in the polymer plus any unreacted reagent which still is present. It is preferred that the amount of neutralizing agent be equal to the molar amount of sulfonating agent originally employed plus 10% more to insure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention comprise substantially neutralized pendant groups and, in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic liquid whose viscosity is to be controlled. To achieve the desired solubility it is required that the polymer to be employed possess a degree of polarity consistent with that solvent. This solubility relationship can readily be established by anyone skilled in the art simply by appropriate texts (e.g. Polymer Handbook, Edited by Brandrup and Immergut, Interscience Publishers, 1967, section IV-341). In the absence of appropriate polymer-solvent compatibility knowledge, this can be determined experimentally by observing whether the selected polymer will be soluble in the solvent at a level of 1 gm. polymer per 100 ml solvent. If the polymer is soluble, then this demonstrates that it is an appropriate backbone for modification with ionic groups to achieve the objectives of this invention. It is also apparent that polymers which are too polar will not be soluble in the relatively nonpolar organic liquids of this invention. Therefore, only those polymer backbones (i.e. as measured in the absence of ionic groups) having a solubility parameter less than 10.5 are suitable in this invention. This precludes the use of such polymers as polyvinyl alcohol, polyacrylonitrile etc. Also highly crystalline polymers are to be avoided since they tend not to be soluble in the relatively nonpolar organic liquids employed herein. Therefore acceptable polymers employed in this invention must possess a level of crystallinity of less than 25%. Thus, these acceptable polymers can be considered substantially non-crystalline.

The preferred ionic copolymers for use in the instant invention e.g. sulfonated polystyrene and substituted derivatives thereof, may be prepared by the procedures described in U.S. Ser. No. 294,489 (now U.S. Pat. No. 3,925,280) filed on Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 0.2 to 10 weight % most preferably from 0.5 to 5 weight % based on said organic liquid. Specific examples of preferred ionomeric polymers which are useful in the instant invention include sulfonated polystyrene, sulfonated poly-t-butyl styrene, sulfonated polyethylene, (substantially noncrystalline) and sulfonated polyethylene copolymers, sulfonated polypropylene (substantially noncrystalline), and sulfonated polypropylene copolymers, sulfonated styrene-methyl methacrylate copolymers, (styrene)-acrylic acid copolymers, sulfonated polyisobutylene, sulfonated ethylene-propylene terpolymers, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well known to those skilled in the art; i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ, however, this is not a preferred operation, since in situ neutralization requires preparation of the sulfonic acid in the organic liquid which is to be subjected to the instant process, or the acid form of the ionic polymer must be dissolved in said organic liquid. The former approach is impractical for many formulators, e.g., where viscosity control of oils (as defined below) is desirable; the latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability, and maximum control over the final mixture of ionic polymer, polar cosolvent and organic liquid. The organic liquids, which may be utilized in the instant invention, are selected with relation to the ionic polymer and vice-versa. For example, the following preferred ionic polymers may be utilized to control the viscosity of the following organic liquids.

| Polymer | Organic Liquid |
|---|---|
| sulfonated polystyrene | benzene, toluene, ethyl benzene, methylethyl ketone, xylene, styrene, ethylene dichloride, methylene chloride |
| sulfonated poly-t-butylstyrene | benzene, toluene, xylene, ethyl benzene, styrene, t-butyl styrene, aliphatic oils, aromatic oils, hexane, heptane, decane, nonane, pentane |
| sulfonated ethylene-propylene terpolymer | aliphatic and aromatic solvents, oils such as Solvent 100Neutral[a], 150 Neutral[b] and similar oils, benzene, toluene, xylene, ethyl benzene, pentane, hexane, heptane, octane, iso-octane, nonane, decane |
| sulfonated styrene-methylmethacrylate copolymer | Aromatic solvents, ketone solvents, dioxane, halogenated aliphatics, e.g., methylene chloride, tetrahydrofuran |
| styrene-acrylic acid copolymers | Aromatic solvents, ketone solvents, tetrahydrofuran, dioxane, halogenated aliphatics, e.g., methylene chloride |
| sulfonated polyisobutylene | Saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons. Solvent 100 Neutral, Solvent 150 Neutral and all related oils, low molecular weight polymeric oils such as squalene, white oils and process oils having 60% or less aromatic content |
| sulfonated polyvinyl toluene | Toluene, benzene, xylene, cyclohexane, ethyl benzene, styrene, methylene chloride, ethylene dichloride, methylethyl ketone, methyl cyclohexane, oils containing at least 40% aromatic content by weight |

[a]Solvent 100 Neutral is a solvent extracted, neutral mineral lubricating oil having a viscosity at 100° F. of about 100 SUS.
[b]Solvent 150 Neutral is a solvent extracted, neutral mineral lubricating oil having a viscosity at 100° F. of about 150 SUS.

In general the organic liquid should possess a solubility parameter ranging from 6.0 to 10.5. Generally the ionic polymer will be derived from a polymer backbone having a solubility parameter within this range also.

This invention unlike the preferred embodiment of the parent case does not include modifying the viscosity characteristics of lubricating oils, that is, this invention is specifically not related to lubricating oils. Instead, this invention relates to modifying organic liquids, for example, organic solvents to achieve the viscosity characteristics described in the parent case. That is, the areas of organic solvent use where isoviscosity, moderate decreases in viscosity, or increased viscosity with increasing temperature is desirable over broad temperature ranges are contemplated by the process and compositions of the instant invention. General organic solvent use areas where the instant invention is applicable include coatings (paints), adhesives, textiles, pharmaceuticals, inks, films (unsupported films as opposed to coatings which are generally supported on solid surfaces), herbicides and pesticides. The type of solvents utilized in these areas include aliphatic, aromatic, and chlorinated hydrocarbons, alcohols, ketones and glycol ethers, that is, any of the above which are within the solubility parameter limitations described herein. Specific examples of commercially useful chlorinated hydrocarbons include carbon tetrachloride, chloroform, ethyl chloride, 1,1-dichloroethane, ethylene chloride, perchloroethane, trichloroethane, etc. Nonchlorinated solvents which are also widely used in the above areas include carbon disulfide, benzene, toluene, xylenes, pentane, hexane, heptane, octane, isooctane, nonane, etc. In all the above areas viscosity plays an important function, that is, it is important to be able to predict and control the flow properties of the organic solvent solutions as a function of temperature. The importance of controllable and predictable flow properties is especially noted in the coatings area. Other miscellaneous solvents which are widely used include nitroethane, nitromethane, nitropropane, phthalate esters, e.g., dibutyl phthalate, di-2-ethylhexyl phthalate, dihexyl phthalate; various other relatively nonpolar esters, e.g., di-2-ethyl hexyl sebacate, di-2-ethylhexyl adipate, mineral spirits and aliphatic lacquer naphtha.

Unlike the preferred embodiment of the parent case, the above-described solvents are generally of a much lower viscosity. Thus, the compositions and process of the instant invention preferably utilize organic liquids having a viscosity, as measured at 100° F., of less than 35 SUS.

In one embodiment of the instant invention, organic solutions having reduced flammability are formulated. It is known that conventional hydrocarbons such as gasoline, xylene, hexane, heptane, jet fuels and the like are very flammable liquids. When exposed to elevated temperatures their high volatility exacerbates this problem. It would be desirable for many applications to create such solutions which would have modest viscosities at ambient temperatures but which would have markedly high viscosities at elevated temperatures. Such solutions would clearly possess significant advantages over the unmodified hydrocarbons. One advantage is that such solutions would have a reduced tendency to volatilize at elevated temperatures; a second advantage would be a reduced tendency to splash or be mechanically dispersed. Finally, in the event that such solutions were ignited, the fact that solution viscosity would increase at the point of highest temperature should substantially reduce the flame propagation rate.

The instant invention describes how such nonpolar hydrocarbons can be modified to create solutions whose viscosities actually increase as temperature increases. In some cases the solutions may not be true solutions but possibly colloidal suspensions either at ambient temperature or at elevated temperatures. Under optimum conditions the solutions will appear homogeneous and free flowing at ambient temperature; however, at elevated temperatures (e.g., 100° to 200° C.) the viscosities may increase sufficiently to create essentially a gel-like system. Under these latter conditions it is apparent that the high viscosity will minimize the general flammability characteristics of the system.

In this embodiment of the instant invention, the preferred fluids are mainly hydrocarbon in nature. These, by definition, tend to be relatively nonpolar, but such liquids as diisobutylene, cyclohexane, styrene, decane, ethyl benzene, methyl ethyl ketone and the like may be included. In general, these liquids are described in terms of the solubility parameter limitations given herein.

Example 4 below describes this facet of the instant invention—that is the flammability of a 5 percent concentration of ionic polymer in a suitable solvent-cosolvent system.

The method of the instant invention includes incorporating a cosolvent, for example, a polar cosolvent, into the mixture of organic liquid and ionomer, to solubilize the pendant ionomeric groups. The polar cosolvent will have a solubility parameter of at least 10.0, more preferably at least 11.0, and may comprise from 0.1 to 40, preferably 0.5 to 20 weight % of the total mixture of organic liquid, ionomeric polymer, and polar cosolvent.

In addition to the requirements for ionic polymer, organic liquid and polar cosolvent there is the additional and important constraint that the polar cosolvent be more polar than the organic liquid. This is required in order that the proper interaction between polar cosolvent and ionic groups be obtained. If we designate the solubility parameter of the organic liquid as $S_L$ and the solubility parameter of the polar cosolvent as $S_p$, then we require that $$S_p \geq S_L + 1.0$$

In other words the polar cosolvent will be substantially more polar than the organic liquid to be thickened.

Normally the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent.

It should be noted that some of the prior art techniques disclose systems wherein organic liquids were thickened by neutralized ionomers and in certain cases, for example, see U.S. Pat. No. 3,396,136, cited above, wherein neutralization in situ with alcoholates inherently provided a very small amount of polar cosolvent in systems similar to those of the instant invention. However, it has now been discovered that polar cosolvent must be present in critical amounts of from 10 to 600 moles per mole of ionic group in order to give the desirable results of the instant invention and preferably from 20 to 400 moles per mole of ionic group. This amount is some 10 to 600 times greater than amounts employed in the cited patent. The criticality of these amounts is demonstrated below.

The method of the instant invention is especially useful for preparing systems wherein the viscosity may be reversibly controlled over broad temperature ranges. Thus, the polar cosolvent is chosen to be substantially non-volatile at the temperatures at which the compositions prepared by the instant method are utilized. In general, this means that alcohols and amines which are the preferred class of polar cosolvents will have a boiling point of at least 50° C. and more preferably, at least 80° C. Specific examples of polar cosolvent include

| | |
|---|---|
| Methanol | Ethylene glycol |
| Ethanol | Diethylene glycol |
| Propanol | Glycol |
| n-butanol | 1,4-butanediol |
| sec-butanol | Dimethyl phthalate |
| Isopropanol | Formamide |
| Pentanol | N-methyl formamide |

| | |
|---|---|
| Hexanol | Pyrrolidone |
| Benzyl alcohol | Propylene glycol |
| 2-ethyl hexanol | Butyrolactone |
| Ethylamine | Dimethyl phosphite |
| Methylamine | N-ethyl acetamide |
| Dimethylamine | |

The compositions prepared by the method of the instant invention have unexpectedly different properties than the prior art systems which utilize ionomeric polymers, without a cosolvent to thicken organic liquids. For example, lightly sulfonated polystyrene (less than 0.5 metal sulfonate groups per 100 repeating units) is soluble in hydrocarbon liquids and behaves as a thickener. Higher sulfonate levels lead to gelled hydrocarbon liquids. However, the viscosity of such solutions or gels decrease markedly and monotonically with increasing temperature. In other words, the simple combination of a two-phase polymer such as polystyrene with a low level of sulfonate groups (from 0.1 to 5.0 mole %) appended, results in a true solution or a gel or a combination of these two states. The viscosity behavior of such liquids with change in temperature is unremarkable — in that one obtains an expected decrease in solution viscosity with increasing temperature. This behavior is typical also of polymers which contain no ionic groups appended and is well known to those skilled in the art.

In the process of the instant invention the addition of a small but critical amount of a polar cosolvent, such as an alcohol, with the hydrocarbon liquid and the sulfonated polymer, results in a homogeneous solution but surprisingly, one in which the solution viscosity can:

(a) be held virtually constant over a broad temperature range;
(b) decrease only slightly as temperature increases;
(c) actually increase as temperature increases.

The difference in viscosity behavior of such solutions when the polar cosolvent is present is unexpected, especially over the broad temperature ranges, observed. For example, in a system comprising 3% by weight sulfonated polystyrene (0.32 mole % sodium sulfonate) in xylene, the solution viscosity is observed to drop from 106 cps at 25° C. to 19.75 cps at 65° C. With the addition of 1.0% by weight of a polar cosolvent, i.e. hexanol the viscosity decreases from 109.6 cps at 65° C. to 79.4 cps at 25° C. By adjusting cosolvent content and/or polymer concentration the viscosity can be held nearly constant over a given temperature range. In the absence of the polar cosolvent the solution viscosity is observed to decrease monotonically as temperature increases.

The following theory is proposed for this unusual viscosity behavior, but there is no intent to be bound thereby. A multiphase polymer, can be defined as a system consisting of two or more phases which, in the bulk polymer are sufficiently incompatible to display two or more phases when studied by small angle X-ray scattering or a similar technique. Polystyrene containing 3 mole % sodium sulfonate groups, displays a continuous polystyrene phase with a sodium sulfonate phase dispersed therein and therefore meets the multiphase criteria. In the sodium sulfonate-polystyrene system, the polystyrene backbone is soluble in xylene as a representative hydrocarbon. The metal sulfonate groups, however, tend to aggregate strongly in xylene such that the system is simply a gel. The addition of a polar cosolvent, such as 1-hexanol, solvates the sulfonate groups very strongly and therefore in a mixed solvent (for example 90% xylene-10% 1-hexanol) the cited polymer is soluble. With a substantial amount of alcohol present, the viscosity-temperature behavior of this system is normal, decreasing rapidly with temperature. However, over a critical alcohol concentration range, the unexpected behavior of viscosity with temperature is observed (i.e., the viscosity either increases with increasing temperature or is relatively constant).

This behavior is consistent with the two polymer phases being solvated somewhat independently by the respective solvents. Thus, the polystyrene backbone will be solvated by xylene with approximately the same effectiveness across a wide temperature range. However, the solvation of the sulfonate groups can be expressed as follows:

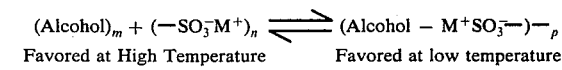

Favored at High Temperature      Favored at low temperature

It is believed that at higher temperatures the dissociation of the solvated sulfonate groups on the right side of the reaction occurs. The consequence of this is that at higher temperatures, increased interchain aggregation and a consequent increase in both polymer reduced viscosity and solution viscosity is observed.

It is clear that if this postulated equilibrium is correct, then the presence of higher levels of alcohol will essentially break up the interchain ionic aggregation. At very low levels of alcohol, there will be insufficient interaction to break up the ionic interaction to permit polymer dissolution. Similarly if the agent (such as the alcohol postulated in the equilibrium) does not solvate the polymer strongly enough again the polymer will not tend to dissolve adequately. Therefore, it is apparent that a relatively polar cosolvent is required.

The compositions prepared by the method of the instant invention have use as explosive compositions, fuels, pigment coatings, and lacquer coatings where viscosity control is important; and in hand soaps, explosives and greases, oils and other lubricants wherein viscosity index improvement is desirable.

The following are preferred embodiments of the instant invention.

EXAMPLE 1

Polymer solutions of 100% neutralized sodium sulfonated polystyrene were prepared in xylene-hexanol solvent mixtures at polymer concentrations of 1,3 and 5 weight percent. The amount of hexanol present in xylene ranged over 0, 1, 3 and 5% levels. Solution of the polymer did not occur in all cases, and in those cases where homogeneous solutions were not obtained, no measurements were performed. For example, with a sodium sulfonate level of 1.98 mole percent in sulfonated polystyrene, a thick gel was obtained when only 1% hexanol was present. Brookfield viscosities of each solution were obtained with an LVT Brookfield viscometer at 25°, 35°, 50° and 65° C. As a control, a sample of polystyrene (3.0 weight percent) with a reduced viscosity of 0.8 was conducted in the same manner. Those results are shown in Table I:

TABLE I

Viscosity (Centipoises) - Temperature Behavior of Polystyrene (Unmodified)
(3.0 weight percent polystyrene); Solvent; Xylene

| 1-Hexanol Alcohol→ Concentration | 0% | 3% |
|---|---|---|
| Temperature ↓ | | |
| 25° C | 3.28 | 3.26 |
| 35° C | 2.95 | 2.88 |
| 50° C | 2.48 | 2.44 |
| 65° C | 2.12 | 2.13 |

EXAMPLE 2

Following the procedure described above the viscosities of sodium sulfonated polystyrene were measured and the results are presented in Tables II and III.

TABLE II

VISCOSITY (CENTIPOISES) - TEMPERATURE BEHAVIOR OF SULFONATED POLYSTYRENE
(Na salt; 0.32 mole %)

| 1-Hexanol Concentration→ | Solvent: Xylene | | | | | | | | | | | |
|---|---|---|---|---|---|---|---|---|---|---|---|---|
| Polymer | 5% | | | 3% | | | 1% | | | 0% | | |
| Concentration→ | 5% | 3% | 1% | 5% | 3% | 1% | 5% | 3% | 1% | 5% | 3% | 1% |
| Temperature, ° C. ↓ | | | | | | | | | | | | |
| 25 | 8.63 | 3.69 | 1.34 | 11.94 | 4.40 | 1.50 | 79.4 | 11.04 | 1.75 | INS | 106.0 | 1.87 |
| 35 | 7.64 | 3.28 | 1.27 | 11.25 | 4.08 | 1.27 | 89.6 | 10.64 | 1.42 | INS | 68.6 | 1.57 |
| 50 | 7.07 | 2.95 | 1.10 | 11.64 | 3.84 | 1.12 | 107.2 | 10.0 | 1.35 | INS | 38.3 | 1.37 |
| 65 | 6.66 | 2.58 | 0.86 | 11.75 | 3.60 | 0.95 | 109.6 | 8.7 | 1.04 | INS | 19.75 | 1.18 |

TABLE III

VISCOSITY (CENTIPOISES) - TEMPERATURE BEHAVIOR OF SULFONATED POLYSTYRENE
(Na Salt, 1.98 mole %)

| 1-Hexanol Concentration→ | Solvent: Xylene | | | | | | | | |
|---|---|---|---|---|---|---|---|---|---|
| Polymer | 5% | | | 3% | | | 1% | | |
| Concentration→ | 5% | 3% | 1% | 5% | 3% | 1% | 5% | 3% | 1% |
| Temperature, ° C. ↓ | | | | | | | | | |
| 25 | 304.8 | 26.65 | 1.42 | 2066 | 162.4 | 1.47 | INS | INS | INS |
| 35 | 316.8 | 25.90 | 1.19 | 2290 | 190.4 | 1.24 | INS | INS | INS |
| 50 | 418 | 32.85 | 1.05 | 3320 | 302.0 | 1.12 | INS | INS | INS |
| 65 | 618 | 44.45 | 0.93 | 5870 | 402 | 0.97 | INS | INS | INS |

(where INS denotes substantially insolubility). The results of Tables II and III contrast vividly with those of the polystyrene homopolymer in Table I. For example, with 3% hexanol and 5% polymer the sulfonated polymer shows almost no viscosity change from 25 to 65° C (in Table II). In contrast polystyrene viscosities drop by 25% with and without alcohol. Similarly the sulfonated polymer (Table II) without alcohol displays a marked decrease in viscosity. However, the same sulfonated polymer at 5% polymer concentration and 1% alcohol displays a 40% increase in viscosity over the same temperature range (Table II).

Note that when critical amounts of cosolvent, e.g., about 200 moles/mole ionic groups in Table II, column 4 or generally from 10 moles/mole ionic groups to 600 moles/mole ionic groups are utilized, the viscosity is approximately constant (within a factor of 2 or 3) over the temperature range studied.

TABLE IV

VISCOSITY (CENTIPOISES) - TEMPERATURE BEHAVIOR OF A SULFONATED t-BUTYL STYRENE-ISOPRENE COPOLYMER
(3.0 mole % Sodium Sulfonate)

| 1-Hexanol Concentration→ | | | |
|---|---|---|---|
| Polymer | 4% | 2% | 1% |
| Concentration | 4% | 6% | 4% | 4% |
| Temperature, ° C. | | | | |
| 25 | 20.4 | 589 | 64 | 614 |
| 35 | 15.26 | 463 | 48.8 | 643 |
| 50 | 11.68 | 436 | 43.5 | 813 |
| 65 | 10.34 | 543 | 50.0 | 1120 |

Again it is apparent that when the polymer and alcohol are present in appropriate concentrations, it is possible to hold viscosity nearly constant (6% polymer concentration, 2% hexanol) or make it increase with increasing temperature (4% polymer concentration, 1% hexanol).

EXAMPLE 3

Preparation of lithium, sodium magnesium and diorthotolylguanidine salts of Sulfo EPT acid.

A sample of sulfonated ethylene-propylene terpolymer was prepared employing techniques well known in the art. The resulting polymer contained approximately 20 milliequivalents of sulfonic acid per 100 grams polymer. Solutions of the acid were prepared by dissolving 30 gms of this polymer acid in 600 ml of a solvent composed of 570 ml benzene and 30 ml methanol. The temperature of the solution was kept at about 60° C. To prepare the appropriate salts;

A. Lithium salt: At 60° C. 21 ml of a solution of 5.1 gm lithium acetate . $2H_2O$ dissolved in a solution composed of 97 ml methanol plus 3 ml of water was added. This corresponds to an excess of 100% lithium acetate to insure complete neutralization. Good agitation was provided to ensure complete mixing in this and in the following experiments.

B. Sodium salt: In this case only 15 gms of polymer acid was dissolved in 600 ml of a solvent composed of 570 ml benzene and 30 ml methanol at 60° C. 21.5 ml of a solution prepared by dissolving 1 gm sodium acetate in 50 ml methanol was added to form the neutalized sodium salt (100% excess of sodium counterion).

C. Magnesium salt: At 60° C., 10.5 ml of a solution of magnesium acetate . $4H_2O$ (10.73 gms magnesium acetate . $4H_2O$ in 8 ml water + 92 ml methanol) was added. This corresponded to a 100% excess of magnesium acetate.

D. DOTG salt: To a solution of polymer acid 30 gms in 600 ml (570 ml benzene plus 30 ml methanol) was added 42 ml of a solution containing 5.98 gms DOTG in 100 ml of solvent comprised of 97 ml benzene and 3 ml methanol.

Each of the neutralized products was worked up by steam stripping the solution, finely subdividing the elastic crumb by high speed shearing of a methanol suspension of the crumb in a suitable blender, filtering the product, air drying the finely divided crumb in a hood overnight, and then drying the product in a vacuum oven at 50° C. The resulting products were analyzed to be

| Sample | Sulfur Content | Metal Content |
|---|---|---|
| A (Li) | 0.57% S | 0.15% Li |
| B Na | — | 0.51% Na |
| C Mg | 0.60% S | 0.33% Mg |
| D (DOTG) | 0.51% S | 0.66% N |

The samples described above were dissolved in xylene solvent or xylene-hexanol mixed solvents at various levels of polymer concentration and hexanol content. The solution viscosities were then measured using the Brookfield viscometer at various temperatures ranging from 0° C. to 100° C. and at various rotational speeds. The data are indicated in tables which correspond to the Li, Na, Mg and DOTG salts respectively. All viscosities are given in centipoises.

Table A

LITHIUM SALT OF SULFO-EPT

| Solvent Composition[a] | Polymer Concentration[b] | 0° C RPM's | 0° C Viscosity | 25° C RPM's | 25° C Viscosity | 50° C RPM's | 50° C Viscosity | 80° C RPM's | 80° C Viscosity | 100° C RPM's | 100° C Viscosity | 120° C RPM's | 120° C Viscosity |
|---|---|---|---|---|---|---|---|---|---|---|---|---|---|
| 100 xylene | 1.5 | .3 | 75,800 | .3 | 14,200 | | | | | | | | |
| | | | | .6 | 16,900 | | | | | | | | |
| | | | | 1.5 | 20,000 | 3 | 8,230(+) | | | 1.5 | 3,160(+) | | |
| | | | | | | | | 6 | 4,165(+) | 3 | 3,140(+) | | |
| | | | | | | | | | | 6 | 3,560(+) | | |
| 99 xylene-1 hexanol | 3 | | | 1.5 | 16,800 | 1.5 | 20,800 | | | 1.5 | 29,360 | 1.5 | 24,400 |
| | | | | 3 | 16,000 | 3 | 19,760 | | | 3 | 28,400 | 3 | 23,600 |
| | | 6 | 5,000 | 6 | 15,940 | 6 | 19,180 | 6 | 18,400(+) | | | | |
| 97 xylene-3 hexanol | 3 | | | | | .6 | 179 | .6 | 355 | .6 | 595 | | |
| | | 1.5 | 92.8 | 1.5 | 104.8 | 1.5 | 153.6 | 1.5 | 326 | | | | |
| | | 3 | 86 | 3 | 92.6 | 3 | 149 | | | | | | |
| 95 xylene 5 hexanol | 3 | 1.5 | 62 | | | | | 1.5 | 58.8 | 1.5 | 98.4 | 1.5 | 136 |
| | | 3 | 57.4 | 3 | 34.6 | 3 | 35 | 3 | 55.4 | 3 | 91 | 3 | 127 |
| | | 6 | 55.8 | 6 | 33.8 | 6 | 34.2 | 6 | 53.5 | 6 | 89.3 | | |

(+) signifies that viscosity readings were erratic and tended to rise with time
[a] and [b] = by weight %.

Table B

SODIUM SALT OF SULFO-EPT

| Solvent Composition[a] | Concentration[b] | 0° C RPM's | 0° C Viscosity | 25° C RPM's | 25° C Viscosity | 50° C RPM's | 50° C Viscosity | 80° C RPM's | 80° C Viscosity | 100° C RPM's | 100° C Viscosity | 120° C RPM's | 120° C Viscosity |
|---|---|---|---|---|---|---|---|---|---|---|---|---|---|
| 100 xylene | 1.5 | 12 | 4400 | 12 | 4380 | 12 | 4170 | | | 12 | 5060 | 12 | 1440 |
| | | | | 30 | 3320 | 30 | 3840 | 30 | 3120 | 6 | 4400 | 30 | 1820 |
| 99 xylene-1 hexanol | 3 | | | .6 | 175,000 | .6 | 111,000 | 1.5 | 82,000 | 1.5 | 70,000 | 6 | 41,000 |
| | | | | 1.5 | 161,200 | 1.5 | 102,000 | | | 6 | 80,000 | | |
| | | 3 | 84,000 | 3 | 162,600 | 3 | 88,400 | | | | | | |
| 97 xylene-3 hexanol | 3 | | | | | 3 | 1330 | 3 | 2950 | 3 | 3620 | 3 | 2900 |
| | | 6 | 600 | 6 | 755 | 6 | 1310 | 6 | 2850 | 6 | 3535 | 6 | 2725 |
| | | 12 | 582.5 | 12 | 742.5 | 12 | 1280 | | | | | | |
| 95 xylene-5 hexanol | 3 | .6 | 188 | .6 | 166 | .6 | 207 | | | .6 | 600 | .6 | 768 |
| | | 1.5 | 158 | 1.5 | 143.2 | 1.5 | 184.8 | 1.5 | 387(+) | | | | |
| | | 3 | 149 | 3 | 133.4 | 3 | 173.4 | | | | | | |

[a] and [b] = by weight %.
(+) signifies that viscosity readings were erratic and may have tended to increase with time Table C

MAGNESIUM SALT OF SULFO-EPT

| Solvent composition[a] | Polymer Concentration[b] | 0° C RPM's | 0° C Viscosity | 25° C RMP's | 25° C Viscosity | 50° C RPM's | 50° C Viscosity | 80° C RPM's | 80° C Viscosity | 100° C RPM's | 100° C Viscosity | 120° C RPM's | 120° C Viscosity |
|---|---|---|---|---|---|---|---|---|---|---|---|---|---|
| 100 xylene | 1.5 | 3 | >400,000 | .6 | 85,400 | 1.5 | 14,800 | 12 | 6,500(+) | 3 | 15,600(+) | 6 | 10,700 |
| | | | | | | 3 | 16,000 | | | | | | |
| | | | | | | 6 | 18,400 | 6 | 13,500(+) | | | | |
| 99 xy- | 3 | 3 | 9,200 | .6 | 22,200 | 6 | 15,600(+) | 1.5 | 43,000(+) | .6 | 86,400(+) | 3 | 144,000(+) |

Table C-continued

MAGNESIUM SALT OF SULFO-EPT

| Solvent composition[a] | Polymer Concentration[b] | Temperature | | | | | | | | | | |
|---|---|---|---|---|---|---|---|---|---|---|---|---|
| | | 0° C | | 25° C | | 50° C | | 80° C | | 100° C | | 120° C | |
| | | RPM's | Viscosity | RMP's | Viscosity | RPM's | Viscosity | RPM's | Viscosity | RPM's | Viscosity | RPM's | Viscosity |
| lene 1 hexanol 97 | 3 | 6 | 8,900 | 1.5 | 21,600 | | | | | | | | |
| | | | | 3 | 20,320 | | | | | | | | |
| xylene 3 hexanol 95 | 3 | 12 | 392.5 | 12 | 340 | 12 | 450 | 12 | 157(+) | | | | |
| | | 30 | 392 | 30 | 337 | 30 | 448 | | | | | | |
| | | 60 | 391 | 60 | 333.5 | 60 | 442.5 | | | | | | |
| xy-: lene 5 hexanol- | 3 | .6 | 202 | .6 | 153 | .6 | 183 | .6 | 418 | | | 3 | 1670 |
| | | 1.5 | 182.8 | 1.5 | 140.8 | 1.5 | 157.6 | 1.5 | 386.8 | | | 6 | 1800 |
| | | 3 | 179 | 3 | 140 | 3 | 154.6 | | | | | 12 | 1784 |

[a] and [b] = by weight %.
(+) signifies that viscosity readings were erratic and may have tended to increase with time Table D

DOTG SALT OF SULFO-EPT

| Solvent Composition[a] | Polymer Concentration[b] | Temperature | | | | | | | | | | | |
|---|---|---|---|---|---|---|---|---|---|---|---|---|---|
| | | 0° C | | 25° C | | 50° C | | 80° C | | 100° C | | 120° C | |
| | | RPM's | Viscosity | RPM's | Viscosity | RPM's | Viscosity | RPM's | Viscosity | RPM's | Viscosity | RPM's | Viscosity |
| 100 xylene | 1.5 | .6 | 550 | .6 | 160 | | | | | | | | |
| | | | | 1.5 | 142 | | | | | | | | |
| | | | | 3 | 138.6 | 3 | 50 | 6 | 18.7 | 6 | 10.9 | 12 | 7.05 |
| | | | | | | 6 | 48.2 | 12 | 17.85 | 12 | 10.65 | 30 | 6.80 |
| | | | | | | 12 | 47.7 | 30 | 17.56 | 30 | 10.52 | 60 | 6.85 |
| 99 xylene-1 hexanol | 3 | 1.5 | 122.4 | 1.5 | 67.2 | | | | | | | | |
| | | 3 | 118.2 | 3 | 65.0 | 3 | 32.6 | | | | | | |
| | | | | 6 | 62 | 6 | 32.3 | 6 | 15.6 | | | | |
| | | | | | | 12 | 30.75 | 12 | 15 | 12 | 9.1 | 12 | 6.65 |
| | | | | | | | | 30 | 14.64 | 30 | 9.0 | 30 | 6.70 |
| | | | | | | | | | | 60 | 9.15 | 60 | 6.60 |
| 97 xylene-3 hexanol | 3 | 3 | 59.4 | 3 | 38 | 3 | 24 | | | | | | |
| | | 6 | 57.2 | 6 | 37.3 | 6 | 23 | 6 | 13.2 | | | | |
| | | | | 12 | 36.85 | 12 | 22 | 12 | 12.75 | 12 | 8.95 | 12 | 7.00 |
| | | | | | | | | 30 | 12.46 | 30 | 8.74 | 30 | 6.26 |
| | | | | | | | | | | 60 | 8.76 | 60 | 6.27 |
| 95 xylene-5 hexanol | 3 | 3 | 58.4 | 3 | 30 | | | | | | | | |
| | | 6 | 55.7 | 6 | 29.8 | 6 | 19 | 6 | 11.7 | | | | |
| | | | | 12 | 28.65 | 12 | 18.15 | 12 | 11.6 | 12 | 8.35 | 12 | 6.30 |
| | | | | | | 30 | 17.84 | 30 | 11.2 | 30 | 8.00 | 30 | 6.30 |
| | | | | | | | | | | 60 | 8.04 | 60 | 6.15 |

[a] and [b] = by weight %.

EXAMPLE 4

A lightly sulfonated polystyrene polymer is prepared according to well known procedures. The sulfonate content is approximately 2.0 mole percent and the resulting polymer sulfonic acid is neutralized with sodium hydroxide to provide the sodium salt. Thus, essentially 2 out of every 100 styrene repeating units are substituted by sodium sulfonate groups. This polymer is dissolved in a mixture of hexanol and xylene (3 volume percent hexanol and 97 volume percent xylene).

About 2 ml of this solution is placed in a metal container and ignited. A smoky flame is observed; there is some bubbling of the solution, presumably due to volatilization, and combustion of xylene. When the flame expires, it is observed that a rubbery-like coating or gel covers the remaining solution.

This example demonstrates that with this invention a very viscous interface is manifested at or near the combustion interface. It is believed that this is desirable to minimize the vigor of the combustion reaction.

The following conclusions can be drawn from these data immediately:

1. In the case of Li, Na, Mg and DOTG salts dissolved in pure xylene (Tables A-D) the solution viscosity generally decreases monotonically as temperature increases. This is the normally accepted behavior. There are some subtle variations especially with sodium which arises from the gelled heterogeneous nature of the solutions.

2. In the case of Li, Na and Mg salts, when dissolved in hexanol/xylene mixed solvents, even at modest hexanol content (3%) it is observed that the solution viscosity actually increases as temperature increases. This is apparent over a broad temperature range and is clearly very exceptional behavior.

3. At higher hexanol contents (about 5%) the solution viscosity apparently goes through a minimum near 25° to 50° C. and then increases as temperature is increased from 0° C. to 100° C.

4. At low hexanol levels (1%) the solution behavior is somewhat anomalous and as indicated, is somewhat erratic. Under these conditions at low alcohol contents with this system it appears that a truly homogeneous solution is not obtained and erratic values result. At 3% polymer concentration (containing approximately 20 milliqeuivalents of sulfonate per 100 grams of polymer) and 1% hexanol concentration, this amounts to about 15 moles of alcohol per mole of sulfonate. It has been determined that a minimum of about 10 moles of polar cosolvent per mole of metal sulfonate is required to result in the desired viscosity phenomenon of this invention. For example, at 5% hexanol (or approximately 75 moles, alcohol per mole of metal sulfonate) the desired viscosity behavior is obtained. Under these conditions the values obtained are significantly more reproducible.

5. The data obtained with the DOTG salt represent a viscosity-temperature behavior which obviously contrasts with that of the metal sulfonate systems. In the case of the amine derivative, the solution viscosity decreases monotonically with increasing temperature. It is suggested that this behavior is a consequence of the weaker interactions inherent in amine salts as contrasted to metal salts. As a result, the interaction between polar cosolvent and ionic species virtually wipes out ionic interactions at even modest cosolvent concentrations. In the metal sulfonate case the stronger ionic association can withstand the interaction with cosolvent such that there is maintained at all temperatures some ionic association. In this latter case, increase of the temperature serves to further promote ionic interaction and thereby increase the solution viscosity. Thus it is clear that amine or ammonium derivatives are not within the concepts of the present invention.

6. Finally as discussed above, behavior which displays the following may be obtained with this invention:

"Constant" over a temperature range from about 25° C. to about 100° C., i.e. the solution viscosity, as measured by techniques well known in the art (i.e. Brookfield viscosimeter), will not vary by more than a factor of 2 over the indicated temperature interval from its value at 25° C.; Increase "substantially" over the temperature range of from 25° C. to almost 100° C. such that the value at 100° C. is at least twice the value observed at 20° C; and In the instant invention the desired viscosity behavior may be manifested at temperatures up to and above 150° C. In some cases at very high temperatures the viscosity will go through a slight maximum and then decrease; however, in most practical applications viscosity control up to 150° C. is adequate.

What is claimed is:

1. A method for controlling the viscosity of organic liquids having a viscosity measured at 100° F. of less than 35 SUS, said organic liquid being selected from the group consisting of aliphatic, aromatic and chlorinated hydrocarbons, alcohols, ketones, organic ethers, organic esters, or nitroderivatives of aliphatic hydrocarbons, and said organic liquid having a solubility parameter of from about 6.0 to about 10.5, which comprises incorporating in said organic liquid a minor amount of a multiphase ionomeric polymer and a polar cosolvent having a solubility parameter of from about 10 to about 20, said polar cosolvent being soluble or miscible with said organic liquid, the solubility parameter of said polar cosolvent being at least 1.0 unit higher than the solubility parameter of said organic liquid, said ionomeric polymer having from about 0.1 to about 25 mole % pendant ionomeric groups, said ionomeric groups being selected from the group consisting of carboxylate, phosphonate and sulfonate, said ionomeric groups being neutralized with a basic material from about 50 to about 500 mole %, said basic material being selected from the group consisting of lead, tin, antimony, Groups IA, IIA, IB or IIB of the Periodic Table of Elements, of polymeric backbone of said ionomeric polymer which is substantially soluble in said organic liquid, said backbone having a solubility parameter of less than about 10.5 and a crystallinity of less than about 25%, said ionomeric polymer being incorporated into said organic liquid at a level of from about 0.1 to about 20 weight % based on said organic liquid, said ionomeric polymer having a number average molecular weight from about 1,000 to about 10,000,000, said polar cosolvent comprising from about 0.1 to about 40 weight % of the total mixture of said organic liquid, said ionomeric polymer, and said polar cosolvent, said polar cosolvent having a boiling point of at least 50° C., said polar cosolvent being present in said mixture at about 10 to about 600 moles per mole of ionomeric groups.

2. The method of claim 1 wherein said polar cosolvent is selected from the group consisting of alcohols and amines.

3. The method of claim 1 wherein said ionomeric polymer is selected from the group consisting of sulfonated ethylene, sulfonated propylene, sulfonated ethylenepropylene copolymers and terpolymers wherein the third monomer is a nonconjugated diene hydrocarbon having from 5 to 15 carbon atoms and sulfonated polystyrene.

4. The method of claim 1 wherein said ionomeric polymer comprises from 0.2 to about 10 mole % pendant ionic groups.

5. The method of claim 1 wherein said ionomeric polymer comprises from 0.5 to 5 mole % pendant ionic groups.

6. The method of claim 1 wherein said ionomer groups are neutralized to a degree of from about 90 to about 200%.

7. The method of claim 1 wherein said ionomer groups are neutralized to a degree of from about 100 to about 200%.

8. The product prepared by the process of claim 1.

9. A composition of matter comprising a major amount of an organic liquid having a viscosity measured at 100° F. of less than about 35 SUS, said organic liquid being selected from the group consisting of aliphatic, aromatic, and chlorinated hydrocarbons, alcohols, ketones, organic ethers, organic esters, or nitroderivatives of aliphatic hydrocarbons, and a minor amount of an ionomeric polymer and a polar cosolvent having a solubility parameter of from about 10 to about 20, the solubility parameter of said polar solvent being at least 1.0 unit higher than the solubility parameter of said organic liquid, said organic liquid having a solubility parameter of from about 6.0 to about 10.5, said ionomeric polymer having from about 0.1 to about 25 mole % pendant ionomeric groups, said ionomeric groups being selected from the group consisting of carboxylate, phosphonate, and sulfonate, said ionomeric groups being neutralized with a basic material from about 50 to about 500 mole %, said basic material being selected from the group consisting of lead, tin, antimony, Groups IA, IIA, IB or IIB of the Periodic Table of Elements, a polymeric backbone of said ionomeric polymer having a solubility parameter of less than about 10.5 and a crystallinity of less than about 25%, said ionomeric polymer being incorporated into said organic liquid at a level of from about 0.1 to about 20 weight % based on said organic liquid, said ionomeric polymer having a number average molecular weight from about 1,000 to about 10,000,000, said polar solvent comprising from about 0.1 to about 40 weight % of the total mixture of said organic liquid, said ionomeric polymer and said polar cosolvent, said polar solvent having a boiling point of at least 50° C.

10. The composition of claim 9 wherein said polar cosolvent is selected from the group consisting of alcohols and amines.

11. The composition of claim 9 wherein said ionomeric polymer is selected from the group consisting of sulfonated ethylene, sulfonated propylene, sulfonated ethylene-propylene copolymers and terpolymers wherein the third monomer is a nonconjugated diene hydrocarbon having from 5 to 15 carbon atoms and sulfonated polystyrene.

12. The composition of claim 9 wherein said ionomeric polymer comprises from about 0.2 to about 10 mole % pendant ionic groups.

13. The composition of claim 9 wherein said ionomeric polymer comprises from about 0.5 to about 5 mole % pendant ionic groups.

14. The composition of claim 9 wherein said ionomer groups are neutralized to a degree of from about 90 to about 200%.

15. The composition of claim 9 wherein said ionomer groups are neutralized to a degree of from about 100 to about 200%.

* * * * *